(12) United States Patent
Schobben et al.

(10) Patent No.: US 8,681,132 B2
(45) Date of Patent: Mar. 25, 2014

(54) SCANNING DISPLAY APPARATUS

(75) Inventors: Daniel Willem Elisabeth Schobben, Eindhoven (NL); Murray Fulton Gillies, Eindhoven (NL); Declan Patrick Kelly, Shanghai (CN); Elmo Marcus Attila Diederiks, Eindhoven (NL); Jurgen Jean Louis Hoppenbrouwers, Eindhoven (NL); Nicolas De Jong, Eindhoven (NL); Johannes Henricus Maria Korst, Eindhoven (NL); Thomas Caspar Kraan, Eindhoven (NL); Adrianus Sempel, Eindhoven (NL); Rogier Winters, Heerlen (NL)

(73) Assignee: Koninklijke Philips N.V., Eindhoven (NL)

( * ) Notice: Subject to any disclaimer, the term of this patent is extended or adjusted under 35 U.S.C. 154(b) by 605 days.

(21) Appl. No.: 10/598,836

(22) PCT Filed: Mar. 11, 2005

(86) PCT No.: PCT/IB2005/050875
§ 371 (c)(1),
(2), (4) Date: Sep. 13, 2006

(87) PCT Pub. No.: WO2005/091124
PCT Pub. Date: Sep. 29, 2005

(65) Prior Publication Data
US 2008/0158144 A1 Jul. 3, 2008

(30) Foreign Application Priority Data
Mar. 18, 2004 (EP) .................................... 04101116

(51) Int. Cl.
*G06F 3/038* (2013.01)
*G09G 3/36* (2006.01)
*G06F 3/01* (2006.01)

(52) U.S. Cl.
CPC .............. *G09G 3/3688* (2013.01); *G06F 3/016* (2013.01)
USPC ........................................... 345/204; 345/156

(58) Field of Classification Search
USPC ................................ 345/156, 173, 179–183; 178/18.01–19.05; 715/702, 773
See application file for complete search history.

(56) References Cited

U.S. PATENT DOCUMENTS

| 5,436,639 | A | * | 7/1995 | Arai et al. ..................... 345/156 |
| 5,504,323 | A | | 4/1996 | Heeger |
| 5,610,629 | A | | 3/1997 | Baur |
| 5,623,344 | A | * | 4/1997 | Lane et al. ..................... 386/81 |

(Continued)

FOREIGN PATENT DOCUMENTS

| EP | 0652505 A1 | 5/1995 |
| EP | 1122792 A2 | 8/2001 |

(Continued)

*Primary Examiner* — Sumati Lefkowitz
*Assistant Examiner* — Jesus Hernandez

(57) ABSTRACT

A scanning display apparatus includes a display operable to receive driver signals and generate corresponding visual information for presentation on the display, to sense radiation received at the display and generating corresponding sensing signals corresponding to a region proximate to the display. The apparatus also includes computer hardware coupled to the display for generating driver signals for the display and for receiving the sensing signals from the display. The computer hardware is operable to provide an interactive user interface at the display.

23 Claims, 7 Drawing Sheets

(56) References Cited

U.S. PATENT DOCUMENTS

| | | | |
|---|---|---|---|
| 5,742,279 A * | 4/1998 | Yamamoto et al. | 345/173 |
| 5,844,547 A | 12/1998 | Minakuchi et al. | |
| 6,353,428 B1 | 3/2002 | Maggioni et al. | |
| 6,377,704 B1 * | 4/2002 | Cooperman | 382/176 |
| 6,429,857 B1 * | 8/2002 | Masters et al. | 345/175 |
| 6,473,102 B1 | 10/2002 | Rodden et al. | |
| 6,518,956 B1 | 2/2003 | Sato | |
| 6,788,293 B1 * | 9/2004 | Silverbrook et al. | 345/173 |
| 7,289,102 B2 * | 10/2007 | Hinckley et al. | 345/156 |
| 2001/0020939 A1 * | 9/2001 | Ikeda | 345/211 |
| 2001/0030644 A1 * | 10/2001 | Allport | 345/173 |
| 2002/0079512 A1 | 6/2002 | Yamazaki et al. | |
| 2004/0117735 A1 * | 6/2004 | Breen | 715/517 |
| 2005/0179653 A1 * | 8/2005 | Hamon | 345/156 |

FOREIGN PATENT DOCUMENTS

| | | | |
|---|---|---|---|
| EP | 1191777 A2 | 3/2002 | |
| JP | 6095803 A | 4/1994 | |
| JP | 7261932 A | 10/1995 | |
| JP | 2001202053 | 7/2001 | |
| WO | WO00/75766 | * 12/2000 | G06F 3/033 |
| WO | WO03061008 A1 | 7/2003 | |
| WO | WO03104965 A2 | 12/2003 | |

* cited by examiner

SCANNING DISPLAY APPARATUS

The present invention relates to scanning display apparatus; in particular, but not exclusively, the invention concerns a scanning display apparatus including a display which is not only operable to display visual information thereon but also to sense proximity of one or more objects presented thereto, wherein such proximity is not limited to actually touching and/or applying pressure to the display as in conventional touch sensitive screens. Moreover, the invention also relates to methods of operating such a scanning display apparatus. Furthermore, the invention also concerns software for executing in one or more computing devices coupled to the display for sensing one or more objects placed in proximity of the display and causing the display to present visual information accordingly.

Touch-sensitive display devices are well known. For example, such touch-sensitive displays are often employed in control panels of apparatus such as sophisticated photocopiers. The touch-sensitive displays are often each fabricated by overlaying a touch-sensitive component including an array of pressure sensors onto a standard liquid crystal display (LCD) provided with a back-lighting unit. The touch-sensitive component is conventionally fabricated as a substantially optically-transparent multi-layer plastics-material component. One or more of the plastics material layers are furnished with a plurality of thin-film metal conductors which either mutually contact when pressure is applied to particular regions of the component or cause a change in capacitance to occur therebetween. Such electrical contact or change of capacitance is detectable to determine which region of the component has pressure applied thereto, such pressure being conveniently applied by way of a user's index finger or pen tip. Often, spatial resolution provided by such a component is relatively poor but nevertheless sufficient for photocopier control purposes. The LCD and its touch-sensitive component are coupled to an associated computing device which controls operation of its associated photocopier, for example optical enlargement, number of copies to be prepared, and exposure adjustment.

In operation of such a photocopier, the computing device executes software which causes the computing device to send information to the display to be presented to a user, for example presenting the user with photocopier configuration options. The user then touches a portion of the touch-sensitive component to select a preferred option; the computer receives information regarding the selected option from the component and then proceeds to perform at least one of: executing a task corresponding to the touched portion, and presenting further options on the display. A contemporary photocopier type iR8500 manufactured by Canon Corporation of Japan utilizes this type of tactile display.

Such a touch-sensitive display is susceptible to further evolution as described in a published European patent application no. EP 0, 652, 505 concerning an input-display integrated information processing device. The input-display device described includes an image display circuit for displaying document and image information, and an image input circuit through which information of an image such as a picture, a photograph, documents drawn or written on a sheet presented by a user can be input. The input-display device further comprises a visual coincidence structure for integrally combining a display screen of the image input circuit so as to establish visual coincidence of the screens as viewed from the user. There is also included a contact information detection circuit for detecting information of a contact position when a finger of the user, the sheet presented by the user or similar makes contact with the contact information detection circuit, the contact information detection circuit being disposed on the whole of the input screen of the image input circuit or the display screen of the image display circuit. Moreover, there is included an image extraction circuit for automatically extracting only a required portion from image information input through the image input circuit. The input-display devices further comprises an image information storage circuit for storing the image information, together with an image synthesis circuit for combining the image with an image which is already displayed and stored. Additionally, the input-display device comprises an image information control circuit for controlling input/output operations of the image information. The device is potentially useable as a photocopier or document scanning device amongst other potential uses.

The inventors have appreciated that such touch sensitive displays can be further enhanced not only to sense regions where pressure is applied, for example finger pressure, but also interpret images of objects presented in close proximity or contact with the displays, for example for data entry purposes. Moreover, the inventors have further envisaged that a manner in which information is presented on the displays can be enhanced to assist ease of use of the displays; such improvements relate to a manner in which data is processed before being presented on the displays.

An object of the invention is to provide an enhanced scanning display apparatus which is easier to use for data entry purposes and which is more interactive when presenting information to its users.

According to a first aspect of the present invention, there is provided a scanning display apparatus, characterised in that the apparatus includes:
(a) a display operable:
  (i) to receive one or more driver signals and generate corresponding visual information for presentation on the display; and
  (ii) to sense radiation received at the display and generate one or more sensing signals corresponding to a region proximate to the display; and
(b) computer hardware coupled to the display for generating the one or more driver signals for the display and for receiving the one or more sensing signals from the display, the computer hardware being operable to provide an interactive user interface (UI) at the display.

The invention is of advantage in that the display apparatus, on account of its integral light emission and sensing properties, is capable of being easier for users to employ in practice.

Preferably, the apparatus is arranged to identify positions of one or more objects placed in proximity of the display by way of ambient illumination to the apparatus obscured by the one or more objects. Such determination of the positions is of benefit, for example, for identifying a coarse location of a document to be scanned placed upon the display in preparation for a fine scan of the document by using illumination generated by the display itself.

Preferably, in the apparatus, the display is operable to generate light radiation for illuminating one or more objects placed in proximity to or on the display, and also for receiving at least part of the light radiation reflected from the one or more objects so as to enable the apparatus to assimilate a scanned image of the one or more objects. Such light radiation generation is beneficial as placement of one or more documents on the display has a tendency to obscure ambient illumination from that part of the display over which the one or more documents are placed.

Preferably, the apparatus is operable to execute a first coarser scan to determine spatial location of the one or more objects on or in proximity of the display, and then execute a second finer scan to assimilate finer details of the one or more objects. More preferably, the second scan is limited to an area of the one or more objects, the second scan utilizing light generated by the display.

Preferably, the apparatus is operable to present a representation of the one or more objects in a region of the display in which the one or more objects were placed during scanning as confirmation of successfully completed scanning. Such presentation renders the apparatus easier and more intuitive for users to employ when performing document scanning operations, for example for facsimile or photocopying purposes.

Preferably, the apparatus is operable to sense one or more objects when placed upon or positioned in proximity to the display and obscuring at least part of the display, and to adapt the user interface (UI) to use those parts of the display which are unobscured.

Preferably, in the apparatus, the computer hardware is operable to de-energize those parts of the display which are obscured by one or more objects placed thereupon for reducing power dissipation within the display. Such de-energization is capable of enhancing operating lifetime of the apparatus and reducing power dissipation therein, namely rendering it less costly in energy during operation.

Preferably, the apparatus is arranged to present the user interface (UI) in squeezed format when an unobscured active region of the display is insufficiently large to include all of the user interface (UI). Such squeezed format enables a user of the apparatus to be aware of possible software applications supported by the apparatus even in a situation where a considerable portion of the display is obscured with objects placed thereupon.

Preferably, in the apparatus, the user interface (UI) includes a scrolling feature for use in accessing squeezed parts of the user interface (UI) presented on the display. Such scrolling features are of benefit in that a user of the apparatus is capable intuitively of gaining access to software applications represented by squeezed portions of the user interface (UI).

Preferably, in the apparatus, a minimum display size limit for the user interface (UI) is defined in the computer hardware, such that obscuring more of the display than defined by the display size limit causes the computer hardware to present at least part of the user interface (UI) in a squeezed format.

Preferably, the apparatus is arranged to present the user interface (UI) comprising a plurality of user interface features, the computer hardware being provided with a priority identifier for each of the features determining which of the features to omit from presentation in the user interface (UI) in a situation where at least part of the display is obscured. Such prioritizing is of advantage in that it renders the user interface (UI) easier for users to employ when a part of the display is obscured by one or more objects.

Preferably, in the apparatus, the computer hardware in conjunction with the display is operable to identify one or more objects in proximity to or in contact with the display and invoke one or more corresponding software applications for executing in the computer hardware in response to placement of the one or more objects.

Preferably, in the apparatus, the one or more software applications are operable to generate one or more animated icons on the display which appear in surrounding spatial proximity to the one or more objects placed on the display, thereby providing a visual acknowledgment that the computer hardware has identified presence of the one or more objects. Such animated icons are capable of providing not only an aesthetically pleasing appearance to the user interface (UI), but also providing intuitive feedback that the apparatus has identified that one or more objects have been placed in proximity to or on the display; optionally, one or more of the icons are not animated. Preferably, in the apparatus, the one or more animated icons are animated by the computer hardware to disperse, preferably scurry away, on removal of the one or more objects from the display.

Preferably, in the apparatus, the display comprises one or more pixel devices capable of both:
(a) generating or transmitting illumination; and
(b) sensing illumination incident thereupon, the one or more pixel devices being fabricated using one or more of:
(c) liquid crystal display devices (LCD) with associated thin-film-transistors (TFT) configured to function as a light sensor; and
(d) polyLED technology.

Whereas liquid crystal display technology is mature and capable of being adapted so that its integral thin-film-transistor pixel address circuits function as light sensors, polyLED technology, namely technology of fabricating polymer-based light emitting diodes, is conveniently capable of integrally providing light emission and light sensing operating characteristics.

The invention is potentially applicable in many potential categories of products, for example in one or more of the following applications but not limited thereto:
(a) a contact type scanner;
(b) webtables;
(c) interactive tables, for example e-tables;
(d) automatic vending machines control panels;
(e) security access panels;
(f) interactive control panels in vehicles;
(g) electronic design drawing boards;
(h) interactive advertisement or information displays;
(i) childrens' interactive toys and (electronic video) games;
(j) teaching aids;
(k) television monitors;
(l) computer monitors, and
(m) tablet PCs According to a second aspect of the invention, there is provided a method of operating a scanning display apparatus including a display, characterized in that the method includes steps of:
(i) receiving one or more driver signals at the display and generating corresponding visual information for presentation on the display; and
(ii) sensing radiation received at the display and generating one or more corresponding sensing signals corresponding to a region proximate to the display; and
(b) in computer hardware coupled to the display, generating the one or more driver signals for the display and receiving the one or more sensing signals from the display, the computer hardware being operable to provide an interactive user interface (UI) at the display.

Preferably, the method includes a step of using pixel devices of the display to generate light radiation for illuminating one or more objects placed in proximity to or on the display, and also for receiving at least part of the light radiation reflected from the one or more objects so as to enable the apparatus to assimilate a scanned image of the one or more objects.

It will be appreciated that features of the invention are susceptible to being combined in any combination without departing from the scope of the invention.

Embodiments of the invention will now be described, by way of example only, with reference to the following diagrams wherein.

Figure 1:
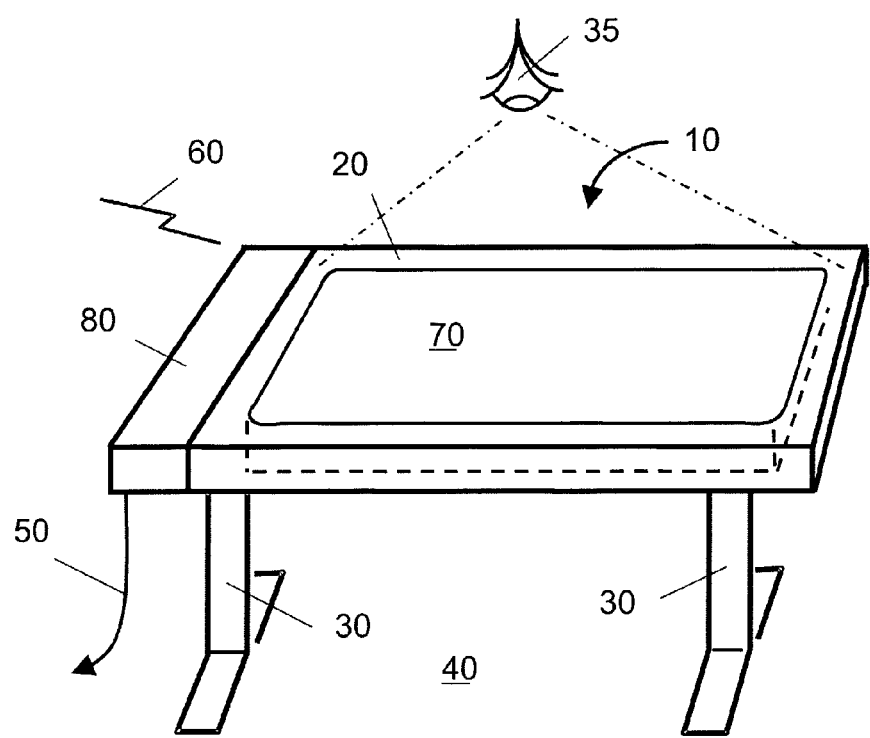
FIG. 1 is a illustration of an exterior view of a scanning display apparatus according to the invention.

Referring to FIG. 1, there is shown a scanning display apparatus according to the invention; the apparatus is indicated generally by 10. The apparatus 10 includes a substantially planar working surface 20 mounted on a frame 30 for supporting the working surface 20 above a floor level 40. The working surface 20 is arranged to be substantially horizontal or slightly inclined in use, for example user-adjustable in a range of 0° to 45° relative to horizontal. The frame 30 is designed so that a user 35 is able to stand or sit beside the working surface 20 and interact with the surface 20 by way of viewing information presented thereat or entering visual information thereto. Moreover, the display apparatus 10 is provided with a power supply unit and associated connection 50 for coupling the apparatus 10 to a source of power, for example mains electricity. Optionally, the apparatus 10 is provided with a data communication link 60, for example a cable link or wireless link, for example for coupling the apparatus 10 to one or more communication networks such as the Internet. Beneath the working surface 20 is a display unit 70 together with associated computer hardware 80, for example one or more processors with associated data memory and display drivers for bi-directionally interfacing with the display unit 20.

Although FIG. 1 is a practical arrangement for an embodiment of the invention, it will be appreciated that other forms of deployment are also possible. For example, the apparatus 10 can be implemented without the frame 30 as a planar unit for placement on substantially horizontal surfaces, for example in a manner akin to a contemporary laptop computer. Alternatively, the apparatus 10 can be wall-mounted in a substantially vertical orientation.

The display unit 70 is distinguished in that it incorporates a two-dimensional array of display pixels. The pixels are operable not only to emit or transmit light radiation, but also to sense light radiation incident thereupon. As will be described in more detail later, the light radiation incident on the pixels can be at least one of pseudo-constant ambient illumination and light radiation generated by the pixels themselves. The display unit 70 is capable of being implemented using a variety of different display and sensing technologies. However, the display unit 70 is most preferably implemented in one or more of:

(a) liquid-crystal display (LCD) technology utilizing associated thin-film-transistor (TFT) circuits for addressing individual pixels, the transistors being adapted also to function as light sensors for sensing light radiation incident thereupon;

(b) implemented using polyLEDs or comparably functioning devices.

For example, LCD, polyLED and TFT technologies can be intermixed in the display unit 70 if desired. Other implementations are also feasible, for example using Philips N. V.'s proprietary electronic ink, namely e-ink, technology with back-lighting if necessary.

PolyLEDs have been already disclosed by Philips N. V. on its Internet web-site. "PolyLED" is an abbreviation used to denote "polymer light emitting diodes" which are a form of electroluminescent device. Such polymer LEDs are preferably sandwiched during fabrication between glass and metal to render them robust in use, for example when incorporated as an array into the display unit 70 of the apparatus 10. Moreover, the polymer LEDs are multi-layer semiconductor devices whose semiconductor junctions are fabricated from semiconductor polymer materials, for example using conjugated substituted or unsubstituted poly(p-phenylene vinylene) materials and chemical vapour deposition fabrication processes as described in a published U.S. Pat. No. 5,504,323 which is hereby incorporated by reference. These polyLEDs are capable of being fabricated to emit light at red, green or blue colour light radiation wavelengths and therefore render the display unit 70 capable of presenting colour images to the user.

Figure 2:
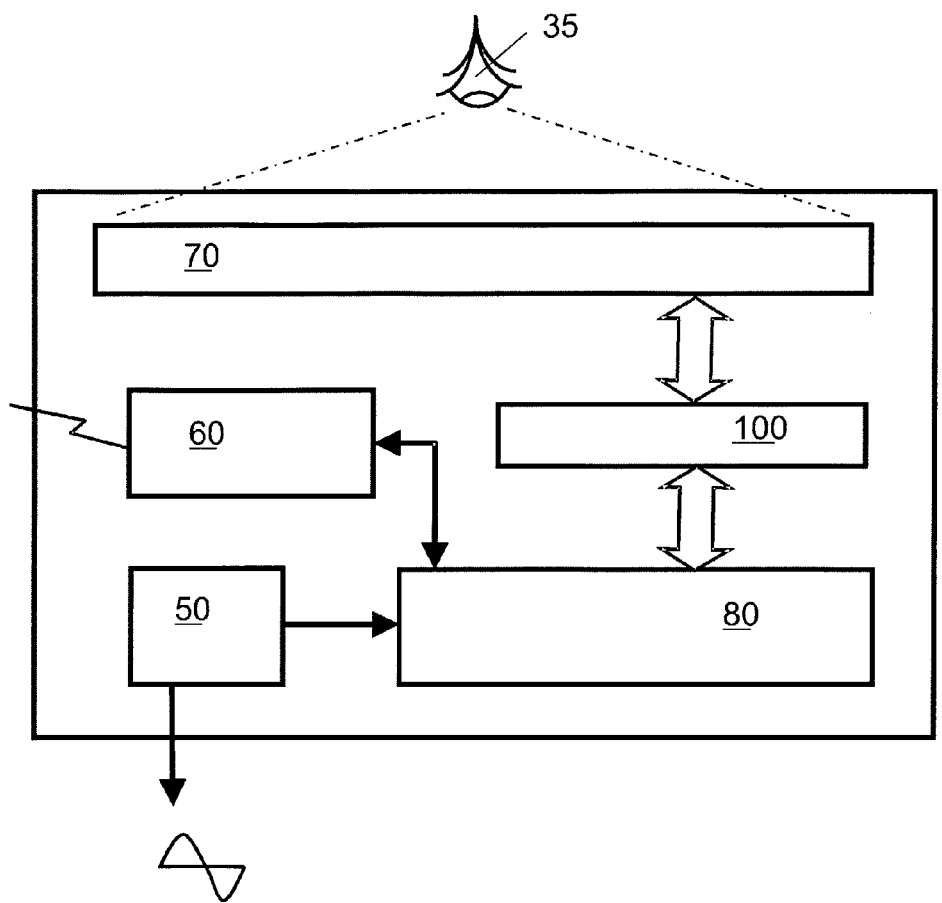
FIG. 2 is a schematic diagram of sections of the apparatus in FIG. 1.

It has been found that polyLEDs are not only operable to emit light radiation when an electrical current is passed therethrough, but also to function as light sensors. Thus, the aforementioned display driver associated with the computer hardware 80 is arranged in a first mode to selectively energize the polyLEDs of the display unit 70 to present images to the user 35, but also in a second mode to sense light radiation incident in the display unit 70 via the working surface 20. Thus, such polyLEDs when employed within the apparatus 10 are capable of integrally emitting and sensing light radiation, thereby distinguishing the apparatus 10 from known touch sensitive display systems described in the foregoing where display and associated touch-sensitive devices are different types of component which are merely juxtaposed in various configurations. FIG. 2 is a schematic diagram of various sections of the apparatus 10. The display driver coupled to the display unit 70 is denoted by 100. It will however be appreciated that the display device 70 is capable of being fabricated using alternative technology to polyLEDs.

Figure 3:
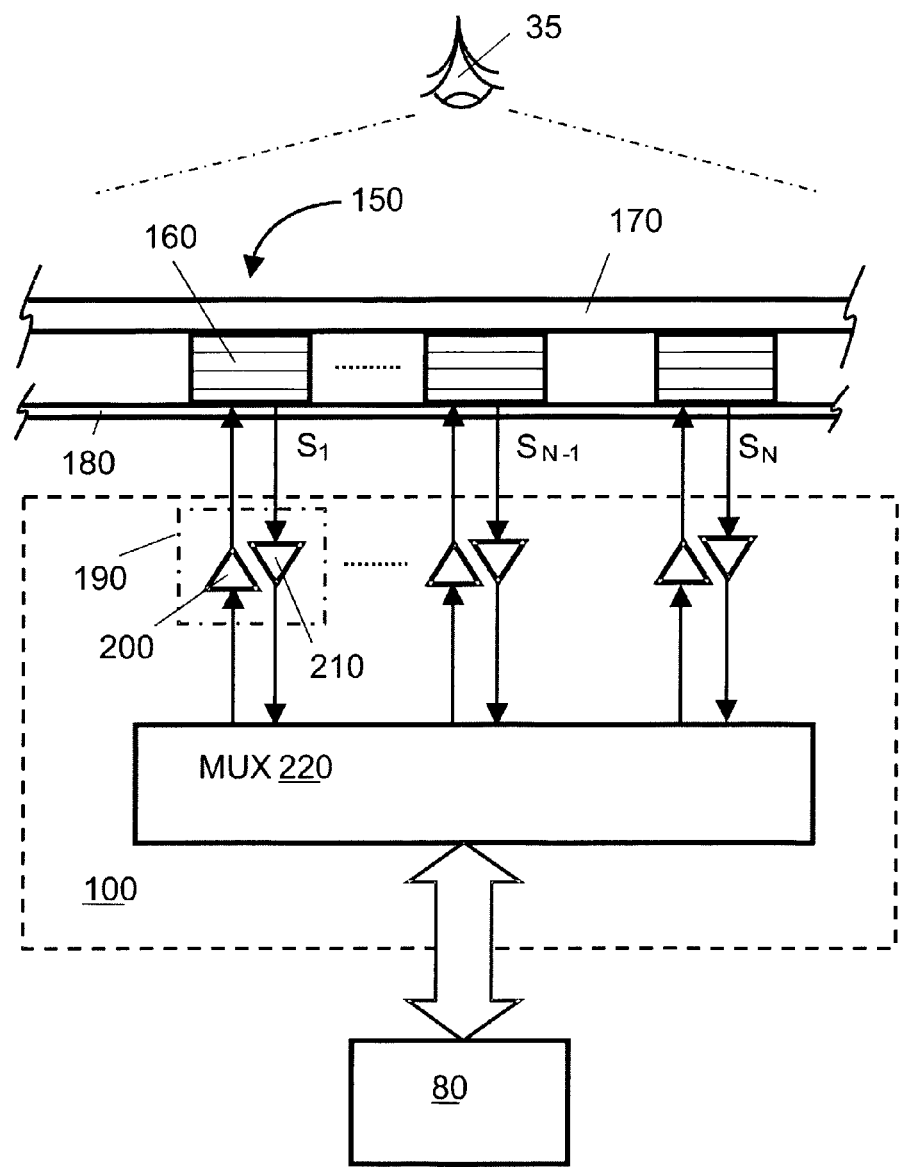
FIG. 3 is a illustration of a pixel element on a display unit of the apparatus of FIG. 1.

In FIG. 3, there is a schematic representation of a two-dimensional array of pixels; one such pixel is indicated by 150. The array includes N pixels ranging from pixel $S_1$ to pixel $S_N$. These pixels 150 preferably operate in a substantially similar manner. The pixel 150 comprises a multilayer polymer junction structure 160 preferably mounted between an upper glass plate 170 for light transmission purposes and a lower metal plate 180 for thermal cooling purposes. Thus, the metal plate 180 serves as a heatsink to remove heat from the structure 160. Moreover, by way of metal film tracks formed on one or more of the glass plate 170 and the metal plate 180, electrical connection are provided individually to the structure 160. Optionally, thin film transistors (TFT) can be employed for address decoding and multiplexing purposes when activating or reading from the structure 160. The glass plate 170 allows for light emitted from the structure 160 during operation to propagate to the user 35; similarly, the glass plate 170 allows for light reflected from or intercepted by objects placed upon or in near proximity of the glass plate 170 to be sensed by the structure 160.

The structure 160 has a bidirectional interface 190 associated therewith, for example a current driver 200 when energizing the structure 160 to generate light and a pre-amplifier 210 for amplifying output current from the structure 160 when functioning as a light sensor. The buffer 190 is coupled to a multiplexer 220 for interfacing between the buffer 190 and the computer hardware 80. The structure 160 is temporally multiplexed between emitting radiation to present visual information to the user 35 and functioning as a light sensor to sense light incident thereupon.

Several operating modes of the apparatus 10 will now be described.

When the user 35 places an object on the display unit 70, the object will block part of the display area of the unit 70. On account of the display unit 70 forming a part of a user interface (UI) provided by the apparatus 10 to the user 35, such placement of the object would obscure part of the user interface (UI) were it not for the apparatus 10 being designed to cope accordingly. The apparatus 10 is devised to adapt content displayed on display unit 70 to be presented only in those parts of the display unit 70 which are unobscured. By doing so, the user 35 is able to see all interaction options without having to move the object. Thus, the user interface (UI) is adapted to cope with partial obscuration of the display unit 70.

Thus, the computer hardware 80 is capable of sensing via the display unit 70, on account of its pixels functioning as light sensors, those regions of the display unit 70 that are visible unobscured to the user 35 and adapting the content of the user interface (UI) so as to be displayed on visible unobscured regions of the unit 70, for example by changing proportions of the user interface (UI) or rearranging its symbols and icons, for example buttons, applications and tool bars. In some cases, it will be possible to display complete content of the user interface (UI) on the unobscured region of the unit 70. When the unit 70 is considerably obscured, the computer hardware 80 is preferably operable to present to the user 35 a simplified user interface (UI) on unobscured regions of the unit 70; the simplified user interface (UI) will then be adapted taking into account its content. Preferably, a description of the content of the user interface (UI) provided to the computer hardware 80 includes priority parameters for one or more individual items of the user interface (UI) content so that the computer hardware 80 is capable of omitting less-essential features of the user interface (UI) when required to present the user interface (UI) on a reduced unobscured region of the unit 70. More preferably, the parameters also specify a minimum area on the unit 70 to which the user interface (UI) can be scaled. Furthermore, when only part of the user interface (UI) content can be displayed on the display unit 70, a part of the user interface (UI) which cannot then be displayed, in view of the minimum area being specified, is preferably shown in squeezed format at an edge of an unobscured, namely visible to the user 35, part of the display unit 70 so that the user 35 is made aware that part of the content of the user interface (UI) is omitted from display. Preferably, the user interface (UI) is implemented so that the user 35 can access such omitted squeezed parts by employing a scrolling operation at the user interface (UI).

Figure 4:
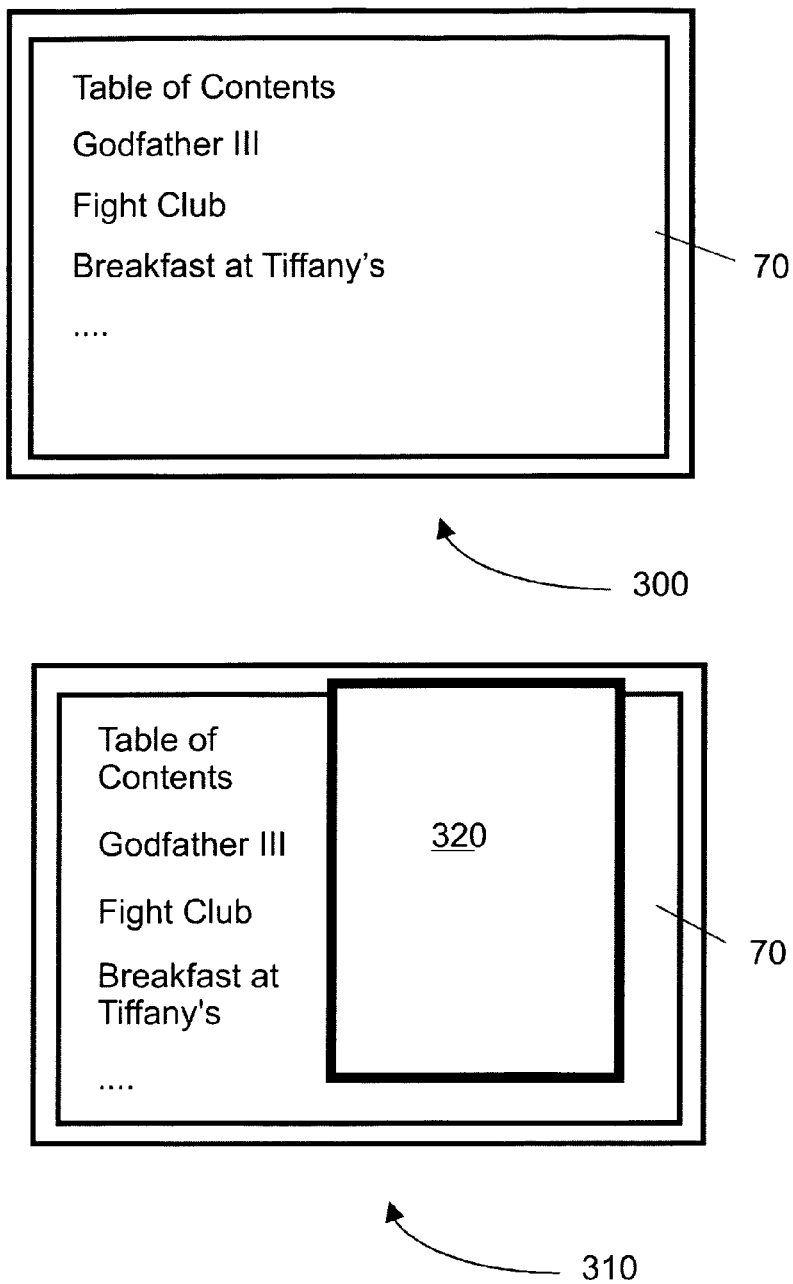
FIGS. 4, 5, 6 are illustrations of adaptive presentation of information on the scanning display in response to an object being placed on the display.

An example of such an adaptive user interface (UI) is provided in FIG. 4. The display unit 70 with a passage of text "Table of Contents Godfather III; Fight Club; Breakfast at Tiffany's . . . " is indicated generally by 300 for a situation where the display unit 70 is not obscured. In comparison, the display unit 70 is partially obscured by an object 320, for example a book rested upon the working surface 20, is a situation indicated generally by 310 where the display unit 70 is operable to sense presence of the object 320 and convey such sensing data to the computer hardware 80. It will be seen from the situation 310 that the aforesaid passage of text has been rearranged so that the user interface (UI) does not utilize an obscured area beneath the object 320, such that the passage of text has been rearranged to utilize that part of the display unit 70 which is not obscured without loss of information presented to the user 35. Preferably, pixels in obscured parts of the display unit 70 are deactivated to reduce power dissipation in and/or increase operating lifetime of the display unit 70.

Figure 5:
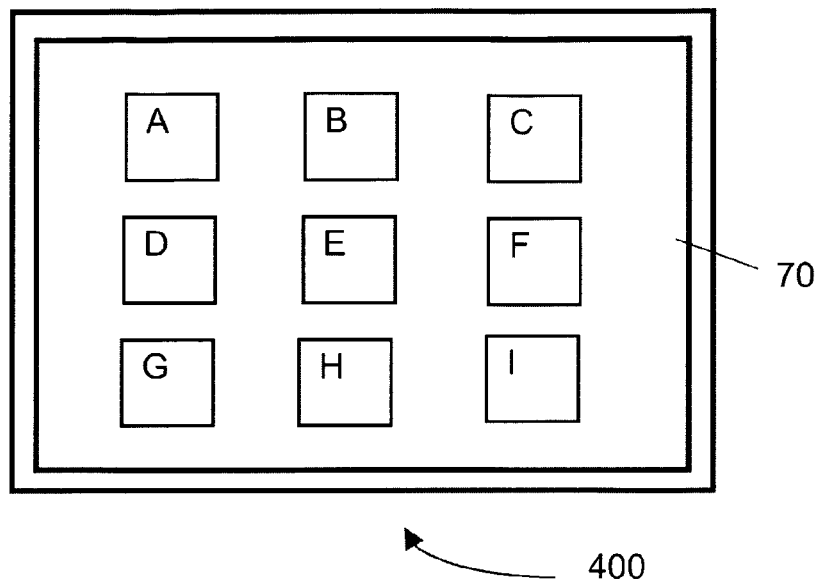
Figure 5:
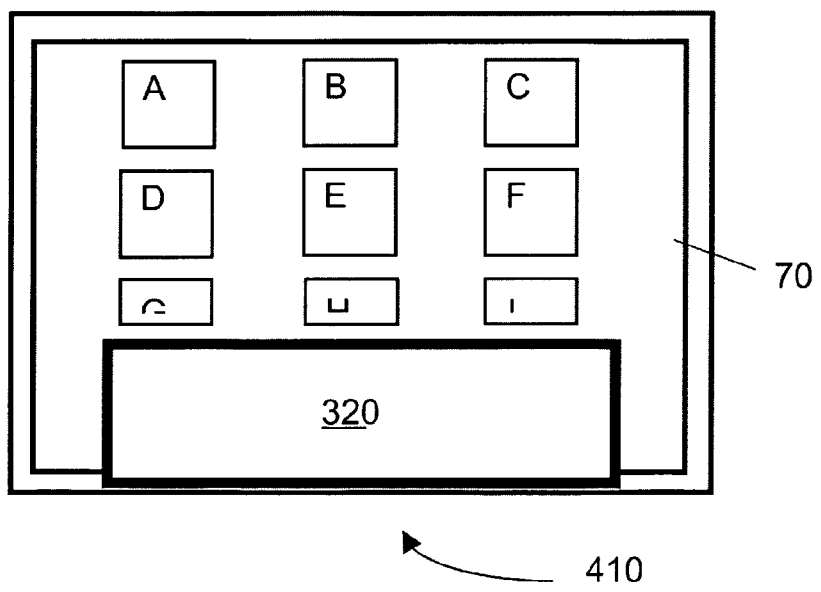
Figure 6:
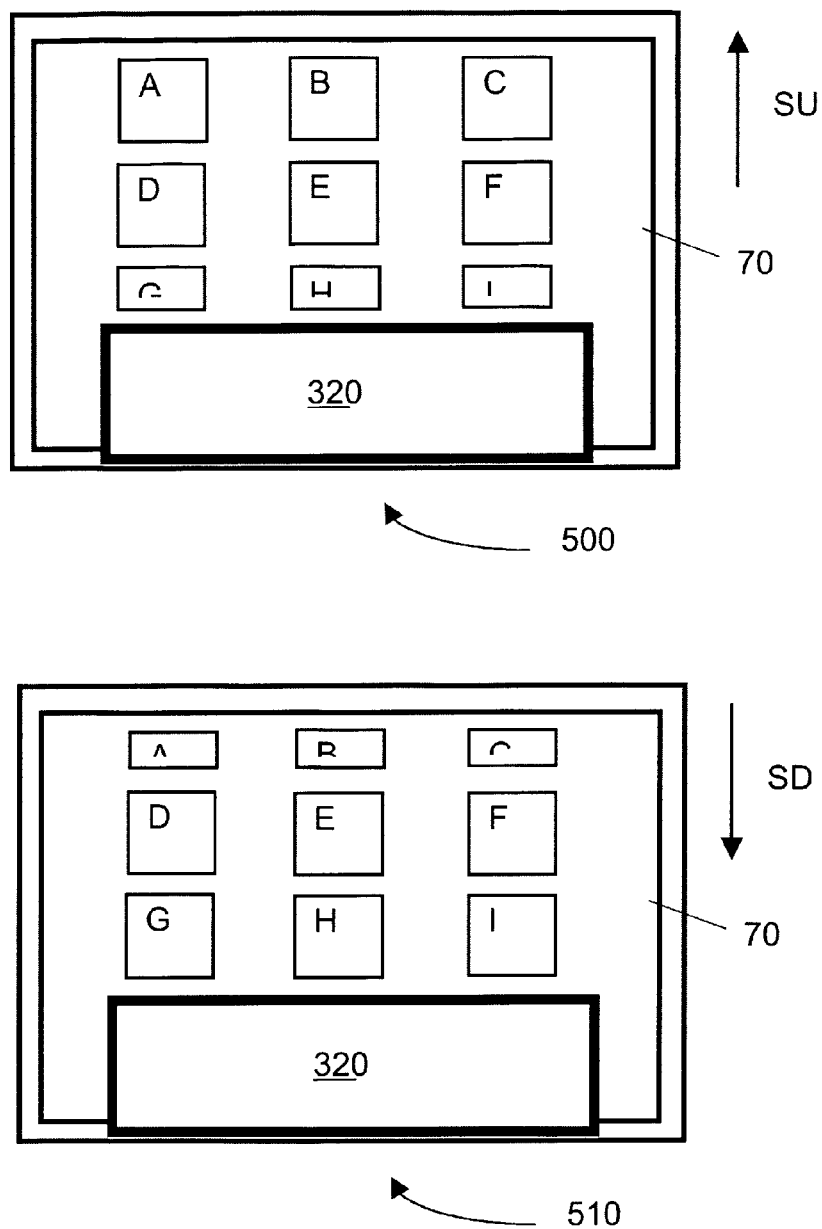

In some circumstances where the display unit 70 is fully populated with information, for example as illustrated in FIG. 5 where the display unit 70 presenting image fields A to 1, for example an array of icon symbols, is indicated generally by 400. In a situation where the aforesaid object 320 is placed upon the display unit 70, the display unit 70 optically senses presence of the object 320 and communicates such data to the computer hardware 80. Software executing on the computer hardware 80 is then operable to squeeze at least some of the data fields A to I so that a vestigial representation of those fields that are squeezed, for example fields GHI as indicated by 410, is presented on the display unit 70 to the user 35. The viewer 35 is preferably capable of scrolling up (SU) and scrolling down (SD) graphical information presented at the UI as indicated by 500, 510 so that squeezed fields are presented in non-squeezed state in response to such scrolling whereas other fields are correspondingly squeezed. By such presentation, the viewer 35 is made aware of available fields and yet permitted by scrolling to view more detailed information regarding each of the fields A to I.

Scrolling can be achieved by the computer hardware 80 presenting additionally one or more scrolling symbols on the display unit 70 so that the user 35 presenting an object, for example a pen tip or a finger in at least near proximity to, but not necessarily touching, one or more of the scrolling symbols, the hardware 80 is operable by executing software thereon, to scroll the fields A to I on the display unit 70. The hardware 80 is preferably arranged to recognize a shape profile of a human hand and there by determine a pointing finger of the hand and hence determine whether or not it is close proximity to one or more of the scrolling symbols. By such an approach, the user 35 merely waving her/his hand near the scrolling symbols can control scrolling of content presented in the user interface (UI). Other objects, for example a mug or book are not recognized by the hardware 80 as being valid visual input for causing scrolling, thereby rendering the apparatus 10 more predictable and reliable in operation in respect of such scrolling.

Software executing on the computer hardware 80 is beneficially capable of recognizing footprints, for example underside surfaces, of other types of objects presented in proximity of the working surface 20. For example, the hardware 80 can be programmed so that placement of a liquid container, for example a coffee mug of the user 35, on the surface 20 is detected by the hardware 80 to be a mug so that the hardware 80, in response, is operable to present an electronic newspaper to the user 35 for a duration the container is in proximity of the display unit 70. Preferably, the hardware 80 is sufficiently responsive on account of its operating software to identify where the container is placed upon the working surface 20 and thereby determine an orientation to present the electronic newspaper so as to be a correct way up for the user 35. Preferably, the hardware 80 is programmed to recognize names of symbols on underside surfaces of such containers, for example white porcelain mugs with names written in black indelible ink onto curved underside surfaces of the mugs, so that the hardware 80 is capable of recognizing the presence of different users and, in response, opening corresponding preferred documents, for example different types of electronic newspaper. The apparatus 10 is preferably adaptable to being presented with a given container, subsequently being presented with a name of a user of the apparatus 10, and then finally associating the user's name with the container so that mere presentation of the container to the working surface is sufficient to indicate to the hardware 80 which user is presently using the apparatus 10. It will be appreciated that the apparatus 10 can associate particularly users with other types of object, for example an identity tag, photograph, codeword written or printed on a piece of card or similar placed on the working surface 20. Thus, the apparatus 10 is susceptible to being configured so that certain objects placed in proximity of the display unit 70 are capable of being recognized by the hardware 80 to correspond to, for example, associated groups of documents. For example, a security tag placed upon the working surface 20 can be arranged to allow access to certain secret or confidential documents on the apparatus 10 which would not normally be available to users of the apparatus 10.

In order to scan objects placed upon the working surface 10, certain selected pixels on the unit 70 are arranged to emit light whereas others are configured to function as light sensors; such operation enables the apparatus 10 to function as one or more of a document scanner, a facsimile device, a photocopier (when coupled in conjunction with a printer), a security checking device (for example a pass-checking desk at an airport). Conversely, or additionally, the hardware 80 can be configured to recognize objects by way of a peripheral outline or shadow cast upon the display unit 70, namely making use of ambient illumination when determining specific regions of the working surface 20 on which objects or documents have been placed prior to undertaking a more detailed scan of those specific regions using illumination generated by the display unit 70 itself.

In order to reduce power dissipation arising within the display unit 70, the hardware 80 is programmed to de-energize those parts of the display unit 70 which are obscured to the user 35 by placement of one or more objects on the working surface 20, for example placement of the object 320 as described in the foregoing.

In order to enhance ease of use of the apparatus 10 to the user 35, when an object is placed upon the working surface 20, the user interface (UI) is operable to present one or more animated icons on the display unit 70, preferably spatially at least partially surrounding the object in the manner of a halo. For example, the animated icons can be one or more of: images of insects such as mosquitoes, fishes, stars, pointer arrows and a generally nebular difference in colour displayed at the working surface 20. Preferably, when an object is placed upon the working surface 20, insect like icons akin to ants are presented by the hardware 80 on the display unit 20 to scuttle to a spatial proximity of the object to surround its footprint in a manner akin to a ring halo. On removal of the object from the surface 20, the animated icons are presented by the hardware 80 by way of the user interface (UI) on the display unit 70 to scuttle away from a spatial proximity of where the object was placed on the surface 20 and disappear. Beneficially, only icons around the object are illuminated, not a larger surrounding peripheral area, thereby reducing power dissipation arising in the display unit 70. Such a form of presentation is especially beneficial in that it rapidly provides the user 35 with an indication of a manner in which software executing upon the hardware 80 is functioning, for example in a related manner to European Patent Office decisions T115/85 and T362/90, namely provides an intuitive and rapid indication that the apparatus 10 has recognized the presence of an object placed upon its working surface 20.

The user interface (UI) presented on the display unit 70 is preferably provided with an image of a alphanumerical keyboard, for example a so-called QWERTY keyboard, which the user 35 can operate to input text into the computer hardware 80. Additionally, or alternatively, the hardware 80 is preferably programmed to present on the display unit 70 an icon akin to a computer mouse and/or tracker-ball symbol that the user 35 can stroke and/or spatial displace in order to affect movement of a pointer-type icon symbol about unobscured region of the display unit 70, thereby preferentially selecting other graphic icons presented on the unit 70 corresponding to software applications executable upon the hardware 80.

It will be appreciated that embodiments of the invention described in the foregoing are susceptible to being modified without departing from the scope of the invention as defined by the accompanying claims.

For example, when scanning one or more objects placed in proximity or in contact with the display unit 70, the apparatus 10 can be arranged to provide an audio bleep or beep at commencement of a scanning operation and at completion of a scanning operation to scan an image of the object into the hardware 80. Preferably, pixels energized to provide illumination to scan the object are temporally multiplexed by way of one or more strobes; moreover, signals generated by pixels functioning as optical sensors during such scanning are preferably demodulated in the respect of the one or more strobes so as to exclude influence of extraneous pseudo-constant ambient illumination incident upon the display unit during operation. More preferably, such demodulation is performed, at least in part, using software executing upon the hardware 80. However, the apparatus 10 is preferably also configured to execute a preliminary investigation, for example based on a silhouette in the presence of ambient quasi-constant illumination of the object placed upon the working surface 20 to determine an area for subsequent detailed scanning using strobed radiation generated from pixels of the display unit 70.

Figure 7:
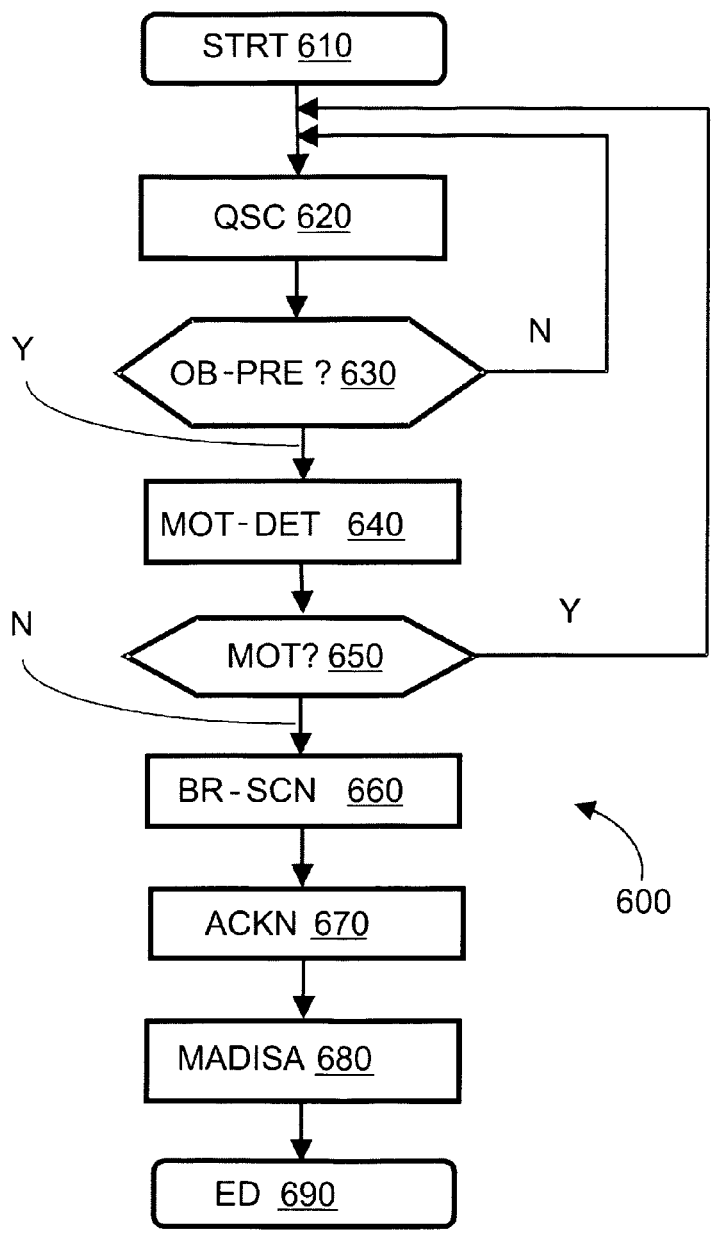
FIG. 7 is a flow chart illustrating steps implemented by an algorithm implemented in software executing on the apparatus of FIG. I for scanning an object presented to the display unit of the apparatus.

An algorithm suitable for scanning objects, for example an A4-format paper document to be scanned in a manner of facsimile machine or photocopier, executable within the apparatus 10 will be described with reference to FIG. 7. The algorithm is represented by way of a flow chart indicated generally by 600. Symbols used within the flowchart 600 have meanings as provided in Table 1.

TABLE 1

| Step reference | Mnemonic code | Interpretation |
| --- | --- | --- |
| 610 | STRT | Start |
| 620 | QSC | Quick scan |
| 630 | OB-PRE ? | Object present ? |
| 640 | MOT-DET | Motion detection |
| 650 | MOT ? | Motion ? |
| 660 | BR-SCN | Bright scan |
| 670 | ACKN | Acknowledgement, for example audio beep |
| 680 | MADISA | Mirror and display image |
| 690 | ED | End |
|  | N | No |
|  | Y | Yes |

Operation of the apparatus 10 in a scanning mode will now be described with reference to FIG. 7.

On invoking scanning within the apparatus 10, the step STRT 610 is executed to start scanning. In the step QSC 620, the hardware 80 operating via the display unit 70 performs a quick coarse scan of the working surface 20 using the pixels of the unit 70 as light sensors; preferably, such scanning utilizes ambient illumination. In the step OB-PRE 630, the hardware 80 determines, for example from silhouette, whether or not an object is present. If no object is present on the surface 20, the hardware 80 returns to execute the step QSC 620 as shown; conversely, if an object placed in proximity of the surface 20 is detected, the hardware 80 progresses to implement the step MOT-DET 640 to determine whether or not the detected object is spatially stable in position.

If, in the step MOT 650, the hardware 80 determines that the object is moving, for example a hand of the user 35 has been detected, the hardware 80 returns to execute the step QSC 620. Conversely, if the object is spatially stationary, namely motionless in a manner of a document held rigidly against the working surface 20 in a manner akin to placing a document for copying upon a glass scanning place of a contemporary photocopier, the hardware 80 next executes the step BR-SCN 660 to perform a bright detail scan of an area of the working surface occupied by the object; preferably, such bright scanning utilizes light radiation generated by the pixels. Moreover, the scanning is beneficially substantially limited to a region of the working surface 20 occupied by the object. The hardware 80 subsequently implements the step ACKN 670 to provide to the user 35 an acknowledgement, namely an indication, of completion of object scanning. Thereafter, the hardware 80 implements the step MADISA 680 whereat the hardware 80 then displays, preferably in a region of the display unit 70 corresponding to where the object is placed, an image of the object so that the user 35 perceives a mirror reflection of the object as present on the unit 70. The hardware 80 then progresses to complete scanning in the step ED 690.

As mentioned before, the apparatus 80 can also be used for playing games. These can be electronic games like "Doom" or "Warcraft", but also traditional board playing games like chess or "Siedler von Catan". Especially with the first type of games, placing objects on the display can be a way to interact with the game. For example in an action game, covering part of the screen causes characters in that part to change behaviour. An example of this is that they are now in dark so the act like the can't see what happens in the rest of the game.

In operation, the hardware 80 is preferably arranged to provide the user interface (UI) as a software multitasking environment so that hardware 80 is able to support execution of concurrent software operations, for example to perform document or object scanning whilst presenting, as described in the foregoing, animated icons around objects placed upon the working surface 20.

If desired, a camera can be coupled to the apparatus 10 for sensing an image of the user 35 for transmission to a remote user at a remote site whilst simultaneously presenting an image of the remote user on the working surface 20, namely on the display unit 70. More preferably, the apparatus 10 is configurable to support concurrent videoconferencing between a plurality of users including the user 35, with a plurality of images of remote users being presented on the display unit 70.

Preferably, the hardware 80 is programmed so that it automatically switches off drive to the display unit 70, for example to reduce power dissipation and prolong pixel operating lifetime, in a situation where the user 35 does not provoke response from the apparatus 10 after a given pause period, for example after ten minutes of inactivity.

The apparatus 10 is capable of being employed in a broad range of circumstances, these circumstances including, but not limited thereto, one or more of the following: contact type scanners, webtables, interactive tables, e-tables, automatic vending machines, security panels (for example where the display unit 70 is used to read users' hand-palms as means for validating user identity), interactive control panels in vehicles (for example automobile control "dashboards", electronic design drawing boards (for example as in engineering and/or architect design studios), interactive advertisement or information displays (for example railway timetable displays), children's' interactive toys and games, teaching aids, television monitors, computer monitors.

In the accompanying claims, numerals and other symbols included within parentheses are intended to assist with understanding the present invention and are not intended to limit the scope of the appended claims in any manner.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

The invention claimed is:

1. A scanning display apparatus comprising:
   (a) a display operable:
      (i) to receive one or more driver signals and generate corresponding visual information for presentation on the display; and
      (ii) to sense radiation received at the display and generate one or more sensing signals corresponding to a region proximate to the display; and
   (b) computer hardware coupled to the display for generating the one or more driver signals for the display and for receiving the one or more sensing signals from the display, the computer hardware being operable to provide an interactive user interface at the display;
   wherein the apparatus is configured to sense one or more objects when placed upon or positioned in proximity to the display and obscuring at least part of the visual information displayed on the display as an obscured portion of the visual information and leaving an unobscured portion of the visual information displayed on unobscured parts of the display unobscured by the one or more objects, and in response to sensing the one or more objects obscuring the obscured portion of the visual information displayed on the display, to adapt the visual information for display on the unobscured parts of the display by rearranging the obscured portion of the visual information already displayed on the display from obscured parts of the display to the unobscured parts of the display for displaying on the unobscured parts of the display, alongside the unobscured portion of the visual information, the obscured portion of the visual information already displayed on the display and moved from the obscured parts without changing a size of the obscured portion of the visual information already displayed on the display.

2. The apparatus according to claim 1, the apparatus being arranged to identify positions of the one or more objects placed in proximity of the display by way of ambient illumination to the apparatus obscured by the one or more objects.

3. The apparatus according to claim 1, wherein the display is operable to generate light radiation for illuminating the one or more objects placed in proximity to or on the display, and also for receiving at least part of the light radiation reflected from the one or more objects so as to enable the apparatus to assimilate a scanned image of the one or more objects.

4. The apparatus according to claim 1, wherein the computer hardware is operable to execute a first coarser scan to determine spatial location of the one or more objects on or in proximity of the display, and then execute a second finer scan to assimilate finer details of the one or more objects.

5. The apparatus according to claim 4, wherein the computer hardware is operable to present a representation of the one or more objects in a region of the display in which the one or more objects were placed during scanning as confirmation of successfully completed scanning.

6. The apparatus according to claim 1, arranged to present the user interface in squeezed format when the unobscured parts of the display is insufficiently large to include all of the user interface.

7. The apparatus according to claim 6, wherein the user interface includes a scrolling feature for use in accessing squeezed parts of the user interface presented on the display.

8. The apparatus according to claim 1, wherein a minimum display size limit for the user interface is defined in the computer hardware, such that obscuring more of the display than defined by the display size limit causes the computer hardware to present at least part of the user interface in a squeezed format.

9. A scanning display apparatus comprising:
(a) a display operable:
(i) to receive one or more driver signals and generate corresponding visual information for presentation on the display; and
(ii) to sense radiation received at the display and generate one or more sensing signals corresponding to a region proximate to the display; and
(b) computer hardware coupled to the display for generating the one or more driver signals for the display and for receiving the one or more sensing signals from the display, the computer hardware being operable to provide an interactive user interface at the display;
the apparatus being arranged to present the user interface comprising a plurality of user interface features, the computer hardware being provided with a priority identifier for each of the features for determining which of the features to omit from presentation in the user interface in a situation where at least part of the display is obscured as an obscured part of the display,
the apparatus being further arranged, in response to detecting that the obscured part of the display is obscured, to move an obscured portion of the visual information from the obscured part of the display to unobscured part of the display without changing a size of the obscured portion of the visual information moved from the obscured part of the display to the unobscured part of the display for display of the obscured portion of the visual information alongside the unobscured portion of the visual information on the unobscured part of the display.

10. The apparatus according to claim 1, wherein the computer hardware in conjunction with the display is operable to identify the one or more objects in proximity to or in contact with the display and invoke one or more corresponding software applications for executing in the computer hardware in response to placement of the one or more objects.

11. The apparatus according to claim 10, wherein the one or more software applications are operable to generate one or more animated icons on the display which appear in surrounding spatial proximity to the one or more objects placed on the display, thereby providing a visual acknowledgement that the computer hardware has identified presence of the one or more objects.

12. The apparatus according to claim 1, wherein the display comprises one or more pixel devices capable of both:
(a) generating or transmitting illumination; and
(b) sensing illuminating incident thereupon, the one or more pixel devices being fabricated using one or more of:
(c) liquid crystal display devices with associated thin-film-transistors configured to function as a light sensor; and
(d) polyLED technology.

13. The apparatus according to claim 1 adapted for use in one or more of the following applications:
(a) a contact type scanner;
(b) webtables;
(c) interactive tables;
(d) automatic vending machines control panels;
(e) security access panels;
(f) interactive control panels in vehicles;
(g) electronic design drawing boards;
(h) interactive advertisement or information displays;
(i) childrens' interactive toys and games;
(j) teaching aids;
(k) television monitors; and
(l) computer monitors.

14. A method of operating a scanning display apparatus including:
(a) a display, wherein the method includes acts of:
(i) receiving one or more driver signals at the display and generating corresponding visual information for presentation on the display; and
(ii) sensing radiation received at the display and generating one or more corresponding sensing signals corresponding to a region proximate to the display; and
(b) in computer hardware coupled to the display, generating the one or more driver signals for the display and receiving the one or more sensing signals from the display, sensing one or more objects when placed upon or positioned in proximity to the display and obscuring at least part of the visual information displayed on the display as an obscured portion of the visual information and leaving an unobscured portion of the visual information displayed on unobscured parts of the display unobscured by the one or more objects, and in response to sensing the one or more objects obscuring the obscured portion of the visual information displayed on the display, adapting the visual information for display on the unobscured parts of the display by rearranging the obscured portion of the visual information already displayed on the display from obscured parts of the display to the unobscured parts of the display for displaying on the unobscured parts of the display, alongside the unobscured portion of the visual information, the obscured portion of the visual information moved from the obscured parts without changing a size of the obscured portion of the visual information already displayed on the display, the computer hardware being operable to provide an interactive user interface at the display.

15. The method according to claim 14, further comprising an act of using pixel devices of the display to generate light radiation for illuminating the one or more objects placed in proximity to or on the display, and also for receiving at least part of the light radiation reflected from the one or more objects so as to enable the apparatus to assimilate a scanned image of the one or more objects.

16. The scanning display apparatus of claim 1, wherein the visual information is adapted so that all the at least part of the visual information moved from the obscured parts are displayed on the unobscured parts.

17. The scanning display apparatus of claim 1, wherein the computer hardware is configured to form a halo surrounding a footprint of the one or more objects to provide an indication of sensing the one or more objects, and wherein the computer hardware is configured to remove the halo upon removal of the one or more objects from the proximity of the display.

18. The scanning display apparatus of claim 1, wherein the computer hardware is configured to perform a coarse scan using ambient illumination to identify positions of the one or more objects and to perform a fine scan, which is finer than the coarse scan, to identify details of the one or more objects using illumination generated by the display.

19. The scanning display apparatus of claim 1, wherein the computer hardware is configured to determine an identity of a user from detection of the one or more objects, and to present preferred visual information preferred by the user.

20. The apparatus of claim 19, wherein the computer hardware is further configured to present the preferred visual information preferred by the user for a duration the one or more objects is in proximity of the display.

21. The apparatus of claim 19, wherein the computer hardware is further configured to determine an orientation of the one or more objects and to orient the preferred visual information based on the orientation of the one or more objects.

22. The apparatus of claim 19, wherein the computer hardware is further configured to recognize presence of different users and display corresponding documents preferred by the different users based on identifying the one or more objects.

23. The apparatus of claim 1, wherein the computer hardware is further configured to associate different users with the one or more objects so that placing an object upon or positioning the object in proximity to the display indicates which user of the different users is presently using the apparatus, the computer hardware being further configured to display a document preferred by the user in response to placing the object upon or positioning the object in proximity to the display.

\* \* \* \* \*